UNITED STATES PATENT OFFICE.

MARTIN E. WALDSTEIN, OF NEW YORK, N. Y., ASSIGNOR OF TWO-THIRDS TO JOSEPH R. DE LA MAR, OF SAME PLACE.

PROCESS OF RECOVERING PRECIOUS METALS FROM THEIR SOLUTIONS.

SPECIFICATION forming part of Letters Patent No. 607,719, dated July 19, 1898.

Application filed March 9, 1896. Serial No. 582,457. (Specimens.)

*To all whom it may concern:*

Be it known that I, MARTIN E. WALDSTEIN, a citizen of the United States, residing at New York, in the county of New York and State of New York, have invented certain new and useful Improvements in Processes for the Recovery of Precious Metals from their Solutions, of which the following is a specification.

My invention relates to the recovery of the precious metals from their solutions by the use of definite quantities of a finely-divided precipitating reagent in a state of agitation.

In this specification wherever I use the term "zinc" I mean to be understood as referring not only to zinc from which all impurities have been removed, but also to commercial zinc, which ordinarily contains a small percentage of other metals, such as lead, bismuth, arsenic, cadmium, and antimony.

Zinc and zinc alloys and amalgams in the form of shreds, threads, turnings, shavings, and granules have heretofore been used as precipitating reagents in processes for the recovery of precious metals from their ores where an aqueous solution of a cyanid has been used as a solvent for the contained minerals, but in all those various forms the zinc must necessarily be supplied in excess of the quantity actually required for the precipitation, inasmuch as means not having been heretofore provided for keeping the divided zinc in a state of agitation each fiber of the filtering-mass must contain a sufficiency of the metal to give to it such an amount of stability as will resist the compression of the flowing solution. Otherwise the comminuted zinc packs closely and either prevents the passage of the solution altogether or separate channels are formed in the compressed mass through which the solution flows without coming in contact with the intervening mass.

In the manufacture of zinc products there is evolved as a by-product a very fine powder known as "zinc-dust," which has very little commercial value. It is therefore very cheap and is in the most desirable form for precipitating purposes, as it can be supplied in exactly the quantity which the metals in the solution may require, thus doing away with the difficulty heretofore experienced of fouling the solution, which always occurs where an excess of zinc is provided, as has heretofore always been done. In the practical manipulation of ores the solution after the metals have been precipitated from it still contains a large amount of the original solvent, which can be utilized for the treatment of fresh ore. It is therefore important that the solution so reused should not contain any zinc.

In the practical working of my process the ores are first subjected to the action of an aqueous solution of the solvent. It is then drawn off into another receptacle, and a test is made to determine the exact quantity of zinc-dust which that body of solution requires. The solution is then drawn off into a precipitating-tank, and the predetermined amount of zinc-dust is added to the solution. In its finely-divided state the zinc-dust would settle to the bottom of the precipitating-tank and effectually resist the percolation of the solution. Therefore I provide for the precipitating-tank a revolving shaft, to which are attached one or more paddles or agitators, which, being set in motion, disperse the zinc-dust throughout the whole mass of the contained solution, the agitation being continued until all the minerals in the solution have been precipitated. The solution is then ready for regeneration and subsequent reuse without being fouled or tainted by the presence of unabsorbed zinc. The valuable precipitate is then passed through a filtering-press and the precious metals recovered according to well-known processes.

I do not claim pulverized or mechanically-divided zinc. I only claim zinc-dust. Zinc-dust or, as it is sometimes known in the markets, "zinc-fumes" is the material which is found in the prolongation of the condenser in the distillation of zinc for the manufacture of various zinc products, such material resulting from a cooling of a portion of the zinc while in a state of vapor. It is an admixture of metallic zinc and zinc oxid. Wherever I use the term "zinc-dust" in this application I refer to zinc and zinc oxid produced in the manner above described or by some equivalent process, and therefore What I do claim as my discovery, and desire to protect by Letters Patent, is—

1. The process of extracting precious metals from cyanid solutions, which consists in treating said solutions with zinc-dust, to wit the herein-described material, composed of zinc and zinc oxid, in a state of agitation substantially as described.

2. In the process of extracting precious metals from cyanid solutions, the use as a precipitating reagent of a definite quantity of zinc-dust in a state of agitation, the quantity of said zinc-dust being supplied in only a sufficient quantity to thoroughly precipitate the contained metals, substantially as described.

3. The process for extracting and recovering precious metals from their ores, and which consists essentially of the following steps; first subjecting the ore in a powdered state to the action of an aqueous solution of a cyanid; second supplying to the solution charged with the precious metals that quantity of zinc-dust, determined to be exactly sufficient to precipitate said metals; third agitating said solution and said zinc-dust until said metals are precipitated and said zinc-dust is absorbed; fourth recovering the precious metals from the valuable precipitate of the preceding step by filtration, or other process, substantially as described.

In testimony whereof I affix my signature in presence of two witnesses.

MARTIN E. WALDSTEIN.

Witnesses:
  A. H. MAAS,
  A. MAGINNIS.